United States Patent Office 3,252,915
Patented May 24, 1966

3,252,915
FOAMABLE PERCHLOROETHYLENE COMPOSITIONS
Gaines C. Jeffrey, Freeport, Tex., assignor to The Dow Chemical Company, Midland, Mich., a corporation of Delaware
No Drawing. Filed Nov. 8, 1962, Ser. No. 236,401
6 Claims. (Cl. 252—171)

This invention relates to foamable perchloroethylene compositions which have valuable utility in cleaning and degreasing processes.

Chlorinated aliphatic hydrocarbons in general have found broad utility as industrial solvents in applications such as dry cleaning, liquid and vapor phase degreasing, extraction, and paint and carbon removal. Perchloroethylene in particular has properties making it an unusually effective solvent for cleaning and degreasing operations. Presently used processes clean articles, particularly metal articles, of undesirable grease and oil by contact with a solvent such as perchloroethylene either as a turbulent liquid or as condensing vapors wherein the contaminating grease or oil is carried away by the condensate. Both these methods have disadvantages. So-called vapor degreasing requires specialized and expensive equipment and high heat input while liquid cleaning employs great volumes of solvent. It would be highly desirable to have an organic solvent which could easily be foamed and used as such in degreasing or like cleaning processes, thereby retaining advantages of both liquid and vapor phase cleaning while eliminating many of their drawbacks.

It is an object of the present invention to provide foamable perchloroethylene. A further object is to afford a process for degreasing and like cleaning wherein the cleaning agent is foamed perchloroethylene.

These and other objects are accomplished according to my invention by employing in such processes perchloroethylene containing from about 0.5 percent to about 15 percent of a specific, specially treated lecithin compound. Such a lecithin product is obtained by reacting a lecithin of either animal or vegetable origin with a peroxy lower aliphatic hydroxy carboxylic acid or a mixture of the corresponding normal acid with hydrogen peroxide under conditions such that about 5–25 percent of the olefinic unsaturation of the lecithin as measured by determination of its iodine value is hydroxylated and partially esterified by the lower hydroxy carboxylic acid. Usually it is most convenient to use a mixture of hydrogen peroxide and the normal acid. Lower hydroxy carboxylic acids suitable for use in this reaction include lactic acid, citric acid, tartaric acid and the like. Suitably treated lecithins have iodine values 5–25 percent reduced from the iodine value of untreated lecithin, which value normally lies in the approximate range 90–100. Such partially hydroxylated lecithins have valuable emulsifying and surface active properties. Their preparation is described in more detail in United States Patent 2,629,662 and a typical commercially available preparation is sold under the trademark "Centrolene S."

Although better cleaning is usually obtained by using a perchloroethylene-hydroxylated lecithin composition in the absence of water, somewhat greater volumes of foam can be made when the composition additionally contains a small amount of water, for example, 0.1–5 percent by weight of water based on the perchloroethylene content. More than 5 percent of water can be used, e.g., up to 10–20 percent, but when the water content is raised above 5 percent, there is increased emulsification of the water and perchloroethylene by the lecithin compound and the cleaning efficiency of the composition is greatly reduced. Water is particularly effective in foam formation with compositions containing low proportions of emulsifier.

*Example 1*

A four foot length of two inch I.D. glass pipe was supported in a vertical position, the lower end being equipped with an air inlet tube terminating within the pipe in a finely porous fritted glass dispersing device. A unit volume of a perchloroethylene-hydroxylated lecithin composition was put in the bottom of the pipe and air at 1 liter per minute was introduced through the glass frit until all the liquid had been converted to a foam or froth. The foams thereby obtained were relatively stable and persistent. The volumes of foam obtained per unit volume of liquid for representative compositions tried are as follows:

Weight percent of
 foam _____ None 20 25 32 37 39 38 26 16 10
Volumes of
 Centrolene S __ 0 1 3 5 6 7 8 10 13 15

Percentages in this and the following examples are based on the weight of perchloroethylene.

*Example 2*

The procedure of Example 1 was repeated using small amounts of water in combination with the various perchloroethylene-Centrolene S compositions. Results are listed in the following table:

| Weight percent of Centrolene S | Weight percent of Water | Volumes of foam |
|---|---|---|
| 1 | 0 | 20 |
| 1 | 2 | 23 |
| 1 | 5 | 30 |
| 1 | 10 | 32 |
| 3 | 0 | 25 |
| 3 | 2 | 38 |
| 3 | 5 | 47 |
| 5 | 0 | 32 |
| 5 | 2 | 33 |
| 5 | 5 | 25 |
| 5 | 10 | 22 |
| 10 | 0 | 26 |
| 10 | 2 | 21 |
| 10 | 5 | 20 |
| 10 | 10 | 20 |

It is seen from the results listed in Example 2 that the presence of water has a harmful effect on foam formation when the proportion of emulsifier exceeds about 5 percent.

Cleaning processes, particularly metal-degreasing operations, are advantageously carried out using foamed compositions such as are described above. The foams themselves can be produced as in the above examples or they can be generated by other means such as shaking or high-speed stirring in contact with air. In the cleaning operation, a large surface area contaminated with an oily substance can be cleaned effectively with a relatively small volume of solvent by contacting the surface to be cleaned with a turbulent foamed composition. By the term "an oily substance" is meant any of the hydrophobic oils or greases commonly encountered as cleaning problems. Mechanical aids such as brushes or wipers may be employed in conjunction with the cleaning composition. The cleaned article can then be hung or stacked out of contact with the foamed solvent, whereupon the structure of any foam adhering to the surface breaks down and the liquid solvent drains off. Alternatively, the cleaned article may be rinsed with a spray of pure solvent.

The treated lecithin emulsifier also contributes detergent properties to the solvent composition, thereby improving its cleaning efficiency. Minor amounts of other detergents, surface active agents, or other additives commonly used in the trade may be combined with the foamable perchloroethylene composition to increase its effectiveness for particular applications.

I claim:

1. Perchloroethylene having dissolved therein about 0.5 to about 15 percent by weight of a hydroxylated lecithin product, said lecithin product consisting essentially of a lecithin containing olefinic unsaturation, the hydroxylated lecithin obtained by reacting said lecithin with a hydroperoxide, and esters of a water-soluble lower aliphatic hydroxy carboxylic acid with said hydroxylated lecithin, said lecithin product having an iodine value about 5–25 percent lower than the iodine value of the corresponding non-hydroxylated lecithin.

2. The composition of claim 1 wherein the hydroxylated lecithin product is present to the extent of 3–10 percent by weight.

3. Perchloroethylene having dissolved therein about 0.1 to about 5 percent by weight of water and about 0.5 to about 5 percent by weight of a hydroxylated lecithin product, said lecithin product consisting essentially of a lecithin containing olefinic unsaturation, the hydroxylated lecithin obtained by reacting said lecithin with a hydroperoxide, and esters of a water-soluble lower aliphatic hydroxy carboxylic acid with said hydroxylated lecithin, said lecithin product having an iodine value about 5–25 percent lower than the iodine value of the corresponding non-hydroxylated lecithin.

4. In a cleaning process wherein articles contaminated with an oily substance are cleaned by contacting said articles with an organic solvent, the improvement wherein said solvent is a foam consisting essentially of perchloroethylene having dissolved therein about 0.5 to about 15 percent by weight of a hydroxylated lecithin product, said lecithin product consisting essentially of a lecithin containing olefinic unsaturation, the hydroxylated lecithin obtained by reacting said lecithin with a hydroperoxide, and esters of a water-soluble lower aliphatic hydroxy carboxylic acid with said hydroxylated lecithin, said lecithin product having an iodine value about 5–25 percent lower than the iodine value of the corresponding non-hydroxylated lecithin.

5. A cleaning process as described in claim 4 wherein the perchloroethylene contains 3–10 percent by weight of the hydroxylated lecithin product.

6. A cleaning process as described in claim 4 wherein the perchloroethylene contains 0.1–5 percent by weight of water and 0.5–5 percent by weight of the hydroxylated lecithin product.

References Cited by the Examiner

UNITED STATES PATENTS

| | | | |
|---|---|---|---|
| 2,162,656 | 6/1936 | Warrington | 252—171 XR |
| 2,276,316 | 3/1942 | Kraybill et al. | 252—356 XR |
| 2,371,647 | 3/1945 | Petering et al. | 252—171 XR |
| 2,450,505 | 10/1948 | Fisher | 252—161 |
| 2,629,662 | 2/1953 | Julian et al. | 99—15 |

JULIUS GREENWALD, *Primary Examiner.*

W. E. SCHULZ, *Assistant Examiner.*